US008090765B2

(12) United States Patent
Yoo et al.

(10) Patent No.: US 8,090,765 B2
(45) Date of Patent: *Jan. 3, 2012

(54) SYSTEM AND METHOD FOR REPRODUCING INFORMATION STORED ON A DATA RECORDING MEDIUM IN AN INTERACTIVE NETWORKED ENVIRONMENT (75) Inventors: Jea Yong Yoo, Seoul (KR); Woo Seong Yoon, Kyonggi-do (KR); Alexandre Limonov, Seoul (KR); Tae Ho Kim, Seoul (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1198 days.

This patent is subject to a terminal disclaimer.

(21) Appl. No.: 10/425,342

(22) Filed: Apr. 29, 2003

(65) Prior Publication Data
US 2003/0229679 A1 Dec. 11, 2003

(30) Foreign Application Priority Data

May 14, 2002 (KR) .................................. 2002-26576

(51) Int. Cl.
G06F 15/16 (2006.01)
H04N 9/80 (2006.01)
(52) U.S. Cl. .......................... 709/203; 709/205; 386/240
(58) Field of Classification Search .................. 709/203, 709/217–219, 248, 230–234; 725/86, 105–153, 725/95; 386/239–248
See application file for complete search history.

(56) References Cited

U.S. PATENT DOCUMENTS

| 5,610,841 | A | * | 3/1997 | Tanaka et al. | 725/115 |
|---|---|---|---|---|---|
| 5,623,483 | A | * | 4/1997 | Agrawal et al. | 370/253 |
| 5,931,906 | A | * | 8/1999 | Fidelibus et al. | 709/217 |
| 6,161,132 | A | | 12/2000 | Roberts et al. | |
| 6,564,255 | B1 | * | 5/2003 | Mobini et al. | 709/219 |
| 6,580,870 | B1 | * | 6/2003 | Kanazawa et al. | 386/240 |
| 6,857,130 | B2 | * | 2/2005 | Srikantan et al. | 725/93 |
| 6,952,835 | B1 | * | 10/2005 | Baum et al. | 725/110 |
| 6,973,461 | B1 | * | 12/2005 | Fleming et al. | 386/334 |

(Continued)

FOREIGN PATENT DOCUMENTS

JP   10-285460 A   10/1998

(Continued)

OTHER PUBLICATIONS

Pronina, K.; Ward, R.; Nasiopoulos, P., "Interactive DVD programming using next generation content-based encoded multimedia data," Image Processing, 2000. Proceedings. 2000 International Conference on , vol. 3, No. pp. 246-249 vol. 3, 2000.*

(Continued)

*Primary Examiner* — Brendan Higa
(74) *Attorney, Agent, or Firm* — Birch, Stewart, Kolasch & Birch, LLP (57) ABSTRACT A method of reproducing information stored on a data recording medium accessible via a communication network comprises loading first information stored on the data recording medium for reproduction, determining if second information associated with the first information is available through the communication network; and synchronizing the reproduction of the first information and the second information with respect to a timing information embedded in the second information. The timing information is relative to a play start time associated with the first information.

11 Claims, 4 Drawing Sheets

U.S. PATENT DOCUMENTS

| | | | |
|---|---|---|---|
| 7,035,531 B2 * | 4/2006 | Tzou | 386/95 |
| 7,047,308 B2 * | 5/2006 | Deshpande | 709/232 |
| 7,313,809 B1 | 12/2007 | Mohan et al. | |
| 7,346,920 B2 * | 3/2008 | Lamkin et al. | 725/112 |
| 2001/0052028 A1 | 12/2001 | Roberts et al. | |
| 2002/0004839 A1 * | 1/2002 | Wine et al. | 709/231 |
| 2002/0049981 A1 | 4/2002 | Tzou | |
| 2002/0088011 A1 * | 7/2002 | Lamkin et al. | 725/142 |
| 2002/0118952 A1 * | 8/2002 | Nakajima et al. | 386/69 |
| 2003/0041159 A1 * | 2/2003 | Tinsley et al. | 709/231 |
| 2003/0081943 A1 * | 5/2003 | Kim et al. | 386/125 |
| 2003/0081944 A1 * | 5/2003 | Kim et al. | 386/125 |
| 2003/0182663 A1 * | 9/2003 | Gudorf et al. | 725/110 |
| 2004/0024818 A1 * | 2/2004 | Yoon et al. | 709/204 |
| 2004/0039834 A1 * | 2/2004 | Saunders et al. | 709/231 |
| 2004/0114906 A1 * | 6/2004 | Yoon et al. | 386/46 |
| 2005/0262542 A1 * | 11/2005 | DeWeese et al. | 725/106 |
| 2006/0159109 A1 * | 7/2006 | Lamkin et al. | 370/401 |
| 2007/0005778 A1 * | 1/2007 | Peng et al. | 709/228 |

FOREIGN PATENT DOCUMENTS

| | | |
|---|---|---|
| JP | 11-98467 A | 4/1999 |
| JP | 2001-148841 A | 5/2001 |
| JP | 2001-521642 A | 11/2001 |
| JP | 2002-57990 A | 2/2002 |
| KR | 1020010010471 A | 2/2001 |
| KR | 2001-0023441 | 3/2001 |
| KR | 2001-0028563 A | 4/2001 |
| KR | 2001-0032202 | 4/2001 |
| KR | 1020010069858 A | 7/2001 |
| WO | WO 0000888 | 1/2000 |
| WO | WO-00/63915 A1 | 10/2000 |
| WO | WO-01/65358 A2 | 9/2001 |

OTHER PUBLICATIONS

Peterson, L. L., & Davie, B. S. (1999). Computer networks: A systems approach. $2^{nd}$ ed. San Francisco, CA: Morgan Kaufmann Publishers. pp. 489-491.*

* cited by examiner

SYSTEM AND METHOD FOR REPRODUCING INFORMATION STORED ON A DATA RECORDING MEDIUM IN AN INTERACTIVE NETWORKED ENVIRONMENT

CROSS-REFERENCE TO RELATED APPLICATION

Pursuant to 35 U.S.C. §119(a), this application claims the benefit of earlier filing date and right of priority to the Korean Patent Application No. 2002-26576, filed on May 14, 2002, the content of which is hereby incorporated by reference in its entirety.

BACKGROUND OF THE INVENTION

1. Field of the Invention

The present invention relates to a method of playing content on an interactive disk, and more particularly, to a method and system for providing an interactive environment for viewers of A/V (Audio Visual) data reproduced from content stored on an interactive content disk or data storage medium, such as an ENAV (Enhanced Navigation) or I-DVD (Interactive Digital Versatile Disk), where additional navigation or interactive content can be received from an associated content server on a communication network.

2. Related Art

A high-density optical disk (e.g., a DVD) has very large storage capacity for digital data. The storage capacity of a DVD is sufficient to record high-quality motion picture data of relatively long duration as well as high-quality audio data.

A DVD has two recording areas, one for actual data (e.g., audiovisual or A/V data) and another for control or navigation data used for reproduction control of the recorded actual data. When a DVD is placed into a DVD player, the navigation data is read into a memory first, and then actual data (A/V data) is reproduced with reference to the instructions or control information included in the navigation data. As a result, a user can view a high quality motion picture stored on a DVD using a DVD player.

Recently, an interactive or enhanced navigation (i.e., "I-DVD" or "ENAV") system has been proposed. An interactive content disk (e.g., I-DVD or ENAV disk) can comprise control, navigation or A/V data in form of 'html' (Hyper-Text Markup Language) or 'xml' (Extensible Markup Language) files. The control data allows an interactive play-back device (e.g., I-DVD or ENAV player) to reproduce A/V data in accordance with the control and navigation data stored on the interactive content disk.

According to the proposed standards for the enhanced navigation system, since information related with reproduction of A/V data is recorded on a content disk in a read-only format, newer various additional contents or newer presentation forms related with the recorded A/V data can not be added, viewed or accessed. As such, a method is needed to allow newer content or information associated with recorded A/V data to be presented.

Furthermore, it is also necessary to develop a method to provide a plurality of users, who view the content of an enhanced navigation disk at separate times and locations with comments and/or additional information provided by other users who have previously viewed or are simultaneously viewing the content of the disk.

SUMMARY OF THE INVENTION

In accordance with one embodiment of the invention, a method of reproducing information stored on a data recording medium using a playing device connected to a communication network comprises loading first information stored on the data recording medium for reproduction, the first information having a play start time ST; determining if second information associated with the first information is available through the communication network; and reproducing the first information and the second information, if any, with respect to a timing information RT associated with the play start time ST, such that at least a portion of the second information is reproduced at time ST+RT.

The second information is provided by a content server connected to the communication network and/or a user device connected to the communication network. The timing information RT, in one embodiment, is embedded in the second information such that a device used for reproduction of the first information can synchronize the reproduction of the first information and the second information.

The first and second information can be audiovisual information. In some embodiments, control information are also stored on the data recording medium, wherein the control information includes a reference to at least a location on the communication network where the second information is stored. In one embodiment, for example, the second information is provided by a user that reproduced the first information using a device connected to the communication network at a play time PT. The second information is discarded from reproduction, if the second information is not reproduced after a threshold time period has lapsed after the reproduction of the first information.

In accordance with another embodiment, a data reproduction system connected to a communication network for reproducing data recorded on a data recording medium comprises first means for loading first information stored on the data recording medium for reproduction, the first information having a play start time ST; second means for determining if second information associated with the first information is available through the communication network; and third means for reproducing the first information and the second information, if any, with respect to a timing information RT associated with the play start time ST, such that at least a portion of the second information is reproduced at time ST+RT.

In one embodiment the control information is stored on the data recording medium to provide a reference to at least a location on the communication network where the second information is stored. The second information is provided by a user that reproduced the first information using a device connected to the communication network at a play time PT.

In one embodiment, the second information is a comment by the user about the result of reproduction of the first information or includes chatting information. The second information is discarded from reproduction, if the second information is not reproduced after a threshold time period has lapsed after the reproduction of the first information. The time information RT represents relative time lapse from the play start time ST. In one embodiment, the data recording medium is an optical disk such as an ENAV DVD disk.

In accordance with another embodiment, a communication network comprises a content server for storing auxiliary information associated with presentation information having a play start time ST; a data reproduction system for reproducing the presentation information stored on a data storage medium; and a means of communication to connect the data reproduction system with the content server, such that the data reproduction system receives the auxiliary data from the content server at a time T2, wherein the data reproduction system reproduces the presentation and auxiliary information with respect to a timing information RT associated with the play start time ST, such that at least a portion of the auxiliary information is reproduced at time ST+RT.

In accordance with yet another embodiment, a method of reproducing information stored on a data recording medium accessible via a communication network comprises loading first information stored on the data recording medium for reproduction, determining if second information associated with the first information is available through the communication network; and synchronizing the reproduction of the first information and the second information with respect to a timing information embedded in the second information. The timing information is relative to a play start time associated with the first information. At least a portion of the second information is reproduced at a time calculated based on the play start time and the timing information.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENT

Figure 1:
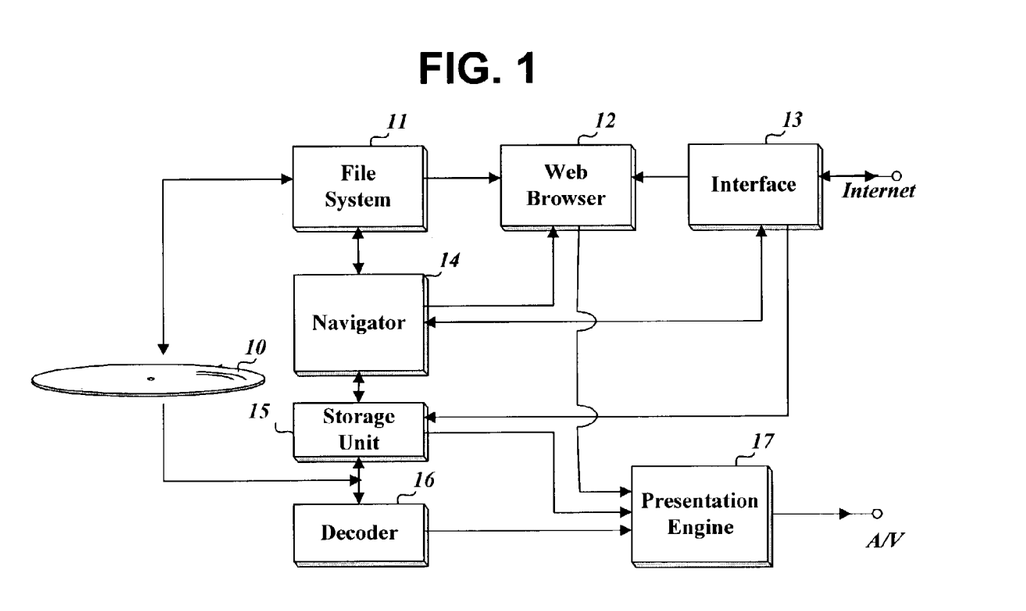
FIG. 1 is a block diagram of a play-back engine for reproducing A/V information stored on an interactive DVD disk in accordance with one embodiment of the invention.

Referring to FIG. 1, the system of the present invention, in accordance with one embodiment, is implemented to reproduce audiovisual (A/V) data stored on a content disk 10. A/V data may comprise DVD video data, image data, audio data, text, or other forms of information. The content disk 10 in addition to A/V data may contain enhanced navigation (ENAV) or control data to provide an interactive play-back device (e.g., ENAV player or I-DVD player) with instruction on how to play-back the A/V data. Hereinafter, the terms ENAV or I-DVD are used interchangeably and shall refer to an interactive DVD system.

Please note that, for the purpose of simplicity and efficiency, throughout the application, the system of the present invention has been described in association with an "I-DVD" disk or "I-DVD" player. This association, however, is by way of example and should not be construed as limiting the invention to the particular embodiments disclosed. As such, alternative recording mediums or players are within the scope of the invention.

An I-DVD player, in accordance with one or more embodiments of the invention, comprises a DVD play-back engine and an enhanced navigation or interactive (I-DVD) play-back engine. The DVD play-back engine is utilized in association with the I-DVD play-back engine to present A/V data stored on the I-DVD disk, in accordance with the enhanced navigation data stored on the I-DVD disk.

In some embodiments, the I-DVD engine of the system comprises a file system 11, a web browser 12, an interface 13, a navigator 14, a storage unit 15, a decoder 16, a presentation engine 17, and a controller (not shown). The web browser 12 and interface 13 provide network management services for connecting the I-DVD player to a communication network such as the Internet, and also to support enhanced user interface and to handle user interaction with the system. The file system 11 and navigator 14 act together to load, parse, and interpret digital data loaded from disk 10 for decoding purposes. The controller is utilized to process enhanced navigation data and the interface between the DVD engine and the I-DVD engine, and to control the system elements in response to a user request, for example.

The decoder 16 is utilized for decoding digital data read from disk 10, for example. The presentation engine 17 processes decoded A/V data to provide an A/V output to a display terminal, for example. File system 11 is provided for conducting file management (e.g., searching and reading recorded files, such as a disk information file, a setup file, and a sync data file), for example. Web browser 12 includes a web surfing function and is able to set up presentation environment for reproduction of A/V data, for example.

Storage unit 15 may be any type of data storage medium such as flash memory or a hard drive for storing files uploaded from disk 10 or files downloaded from a communication network to which the system is connected. Storage unit 15 can be cache memory or a buffer for temporary storage of information, for example, and may be implemented in RAM, ROM, EEPROM, a hard disk or other type of storage medium.

The navigator 14, the file system 11, and the web browser 12 represent logical units and may be implemented in form of software, hardware, or a combination of the two. In some embodiments, some or all of the logical units and components illustrated in FIG. 1 may be implemented in one or more integrated logic chips such as Field Programmable Gate Arrays (FPGAs) or Application Specific Integrated Circuits (ASICs).

Figure 2:
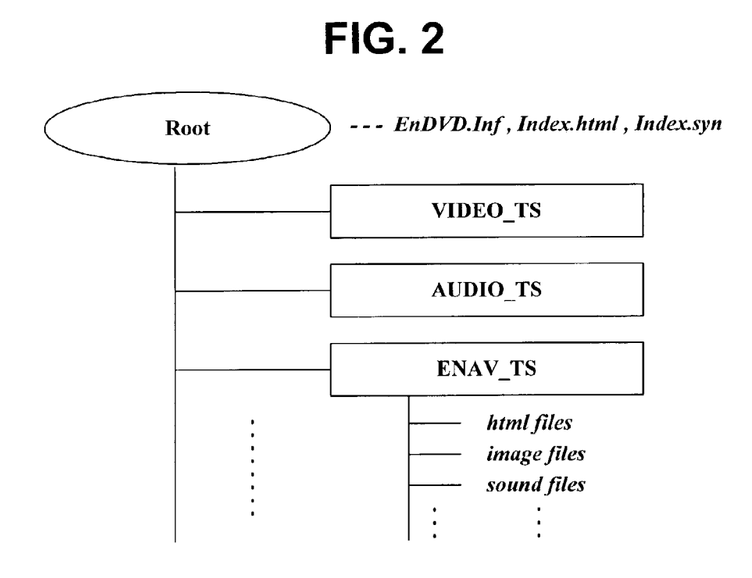
FIG. 2 shows an exemplary directory structure of an interactive DVD file system, in accordance with one embodiment of the invention.

Referring to FIG. 2, in accordance with one or more embodiments of the system, one or more data and/or control files exist or can be implemented under a root directory of the I-DVD disk. A DVD enhanced navigation directory (i.e., DVD_ENAV or ENV_TS) directory may exist, for example, directly under the root directory as shown in FIG. 2. Files including enhanced navigation or other control information and enhanced navigation content files may be placed under the DVD enhanced navigation directory. These files may include html, xml, and A/V content, for example.

In some embodiments, a first file 'EnDVD.Inf', for example, comprises information for reproduction of A/V data recorded on an I-DVD disk 10, a second file 'Index.html', for example, comprises information relating to initial setup for reproduction of A/V data, and a third file 'Index.syn', for example, comprises time information for synchronizing between A/V data and additional data provided through the communication network or a user.

In some embodiments, under the root directory, other subdirectories may be implemented. A directory 'VIDEO_TS', for example, may comprise files of video data. Another directory 'AUDIO_TS', for example, may comprise files of audio data, and a subsequent directory 'ENAV_TS', for example, may comprise additional content files (e.g., 'html' files, 'xml' files, image files, video and audio files).

In one embodiment, the file 'EnDVD.Inf', for example, under the root directory comprises information about a disk version, a content version, a content manufacturer, or a reference address (e.g., URL) for accessing a content server. The content server may provide a variety of contents and content-related information provided by other users connected to the same communication network or new update information that correspond with the A/V data being reproduced at a certain time interval.

The setup file 'Index.html', for example, under the root directory may comprise environment setup information for the web browser 12 and control or navigation information for reproduction of the content stored on I-DVD disk 10. The file 'Index.syn', for example, may comprise time stamp data to synchronize A/V data read from the I-DVD disk 10 with other contents down loaded from a content server, for example.

In some embodiments, the directory 'ENAV_TS', for example, comprises additional contents to be presented or outputted in synchronization with A/V data. Additional contents provided from a content server may be also stored under the directory 'ENAV_TS', for example. The additional contents may comprise html or xml files, image files, sound files, and video files, for example. It is noteworthy that the file and directory names and the particular data structures disclosed here with reference to the A/V and enhanced navigation data are for the purpose of example. As such, other names and different or equivalent directory structures and formats may be implemented or used that would accomplish the objectives of the present invention in the same manner to perform the same function and to obtain the same results, without limiting the scope of the invention.

Figure 3:
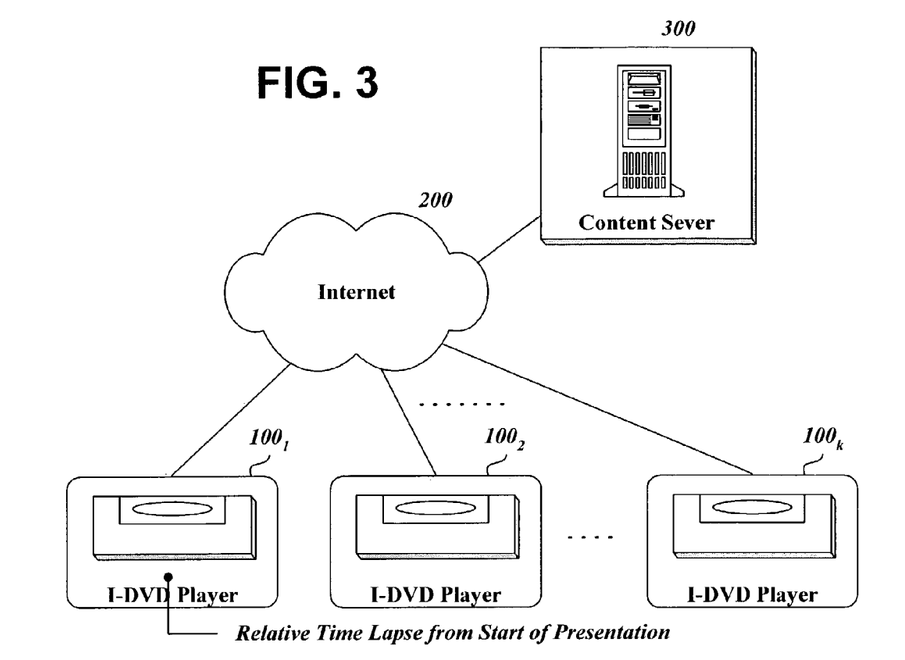
FIG. 3 shows an exemplary communication network where a plurality of interactive DVD play-back devices are connected to a content server, in accordance with one embodiment of the invention.

Now, referring to FIG. 3, in one embodiment of the invention, a plurality of interactive play-back devices, (e.g., I-DVD players) are connected to a content server 300 through a communication network, such as the Internet. The content server 300 can provide a virtual theater service (VTS) to several users. In a VTS communication network, the content server 300 broadcasts additional content (e.g., update information, chatting information, etc.) associated with A/V data stored on an I-DVD disk to a plurality of networked I-DVD players $100_1$ to $100_k$, for example.

The additional content is provided to one or more I-DVD players when the content server learns that a particular A/V information is being played by said I-DVD players. When the additional content is received by the I-DVD player, then the I-DVD player plays the provided additional content at about the same time as the particular A/V data is being played back.

In a VTS communication network, chatting data can be provided to a first user who is watching a movie, for example, reproduced from an I-DVD disk. Assuming that a second user has already watched the same movie, the second user may have utilized the interactive features of the I-DVD system to make a comment about a particular scene of the movie played at a time T after the beginning of the movie. As provided in further detail below, the interactive system allows the first user who is watching the same movie to listen or see the comment made by the second user at the same time in the duration of the movie as it was made.

For example, the second user may have started playing the I-DVD movie at 10 p.m. on Friday night, and during the second scene of the movie he made a comment about the shirt worn by the actor. The first user may play the movie at 8 a.m. the next Saturday morning by playing his copy of the same I-DVD movie. When the second scene of the movie is played, the first user will see the comment made by the second user about the actor's shirt, because the I-DVD system interacts with the content provider to determine if any additional content associated with the second scene of the movie has been posted on the network for play-back.

Figure 4:
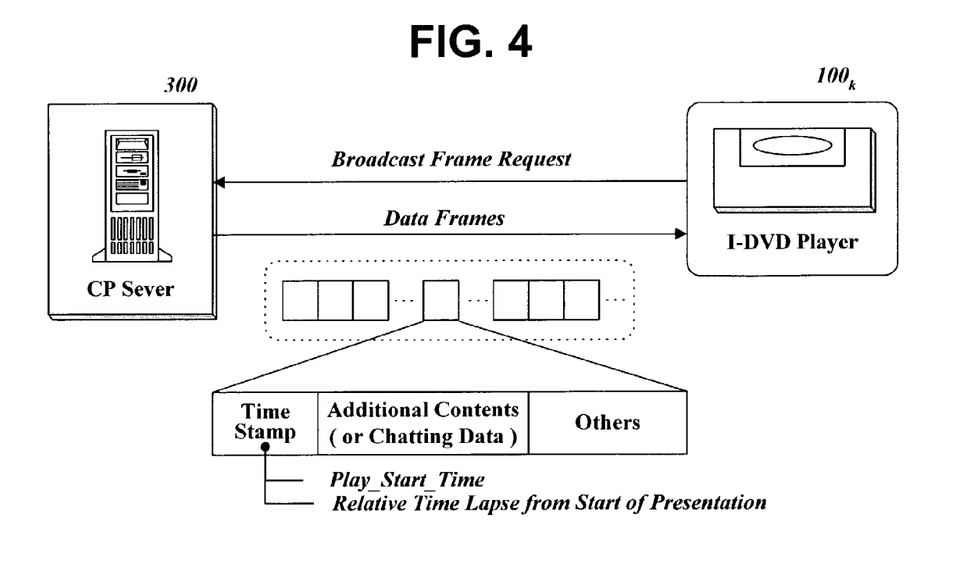
FIG. 4 shows format of a data frame broadcasted from a content server to a plurality of interactive DVD play-back devices, in accordance with one embodiment of the invention.

To accomplish the above content tracking and content sharing at the proper time in the duration of the play-back, the content server 300 adds one or more time stamps to each data frame for the additional content provided to an I-DVD player, as shown in FIG. 4. The time stamp comprises the relative time lapsed from the time the presentation started (i.e., play start time). If a data frame includes, for example, chatting data, the time stamp may include the play start time of a user who produced the chatting data. This information is used so that the I-DVD player can replay the additional data at the appropriate time.

An I-DVD player or other play-back device receiving the time stamped data frame compares its current playing time with the time stamp embedded in the data frame, and either discards the data frame or presents additional data included in the data frame along with A/V data being reproduced from an I-DVD player. Additional content provided is sometime discarded depending on implementation of the I-DVD system. For example, a user may choose not to receive certain additional data, or if the additional data is not received at the appropriate time by the user to be played with the particular associated A/V data, then it is not played.

Before an I-DVD player can synchronize the additional data provided by the content server for play-back with the A/V data stored on the I-DVD disk, certain startup procedures are performed. In certain embodiments, the startup procedure comprises identifying the playback mode, decoding startup files, decoding the A/V data and/or the additional data loaded from the I-DVD disk and/or the content server, and launching the enhanced navigation application to play the loaded information.

Figure 5A:
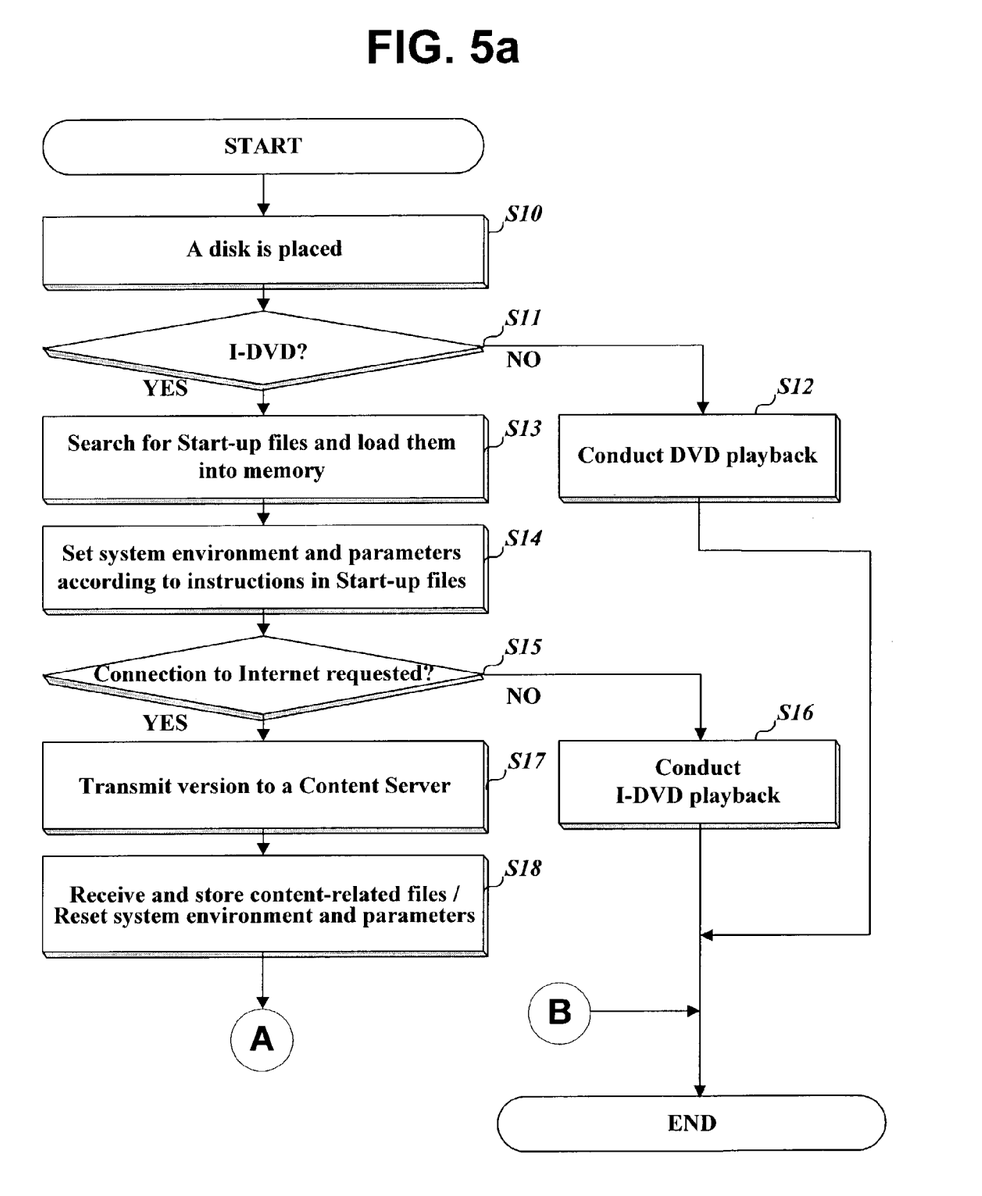
FIGS. 5a and 5b are flow diagrams illustrating a method of presenting A/V information using an interactive play-back device, in accordance with one embodiment of the invention.
Figure 5B:
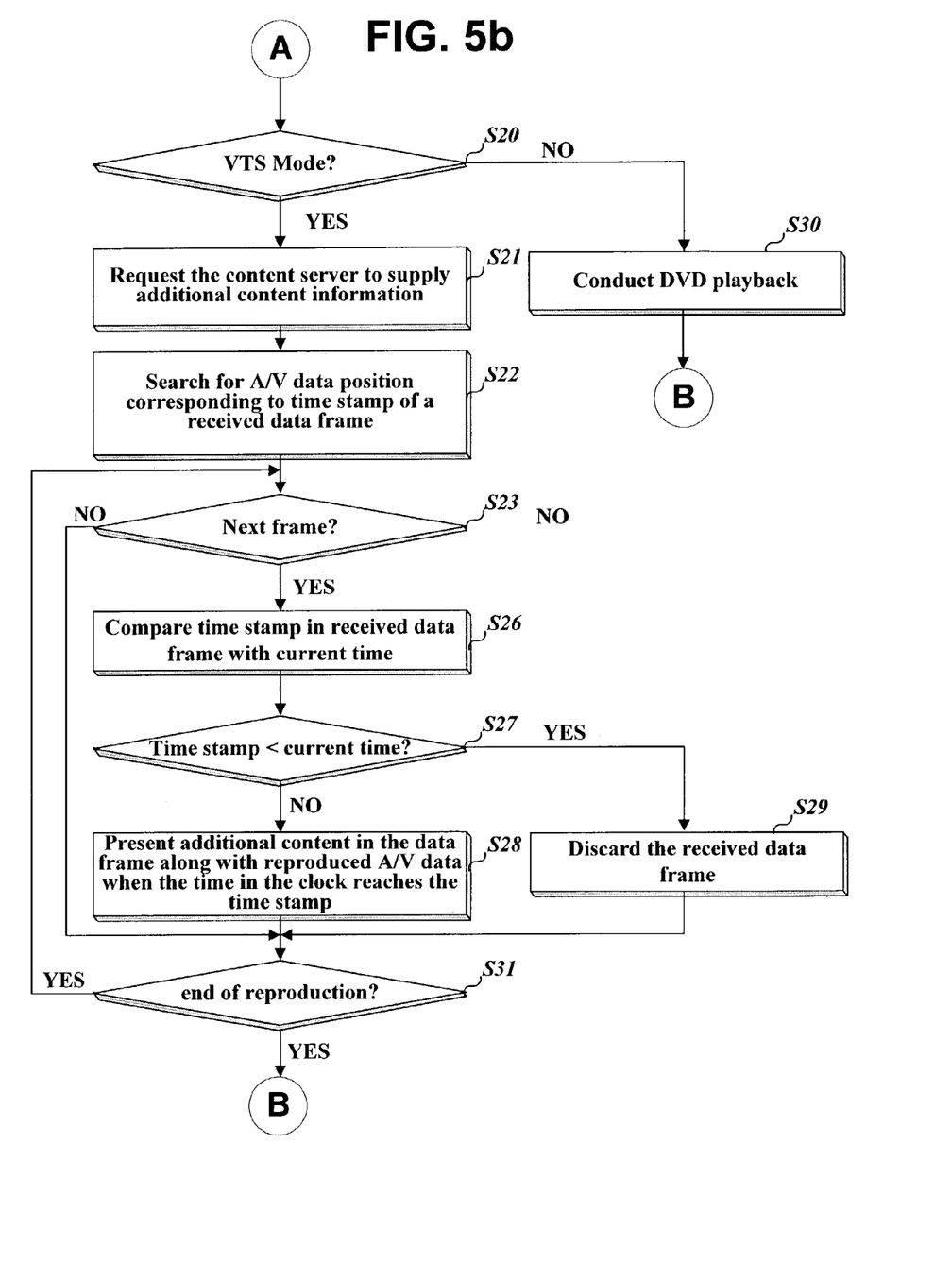

Referring to FIGS. 5a and 5b, if a media disk is placed into an I-DVD player then it is determined if the additional content information are to be played back or not (S11). If, for example, the user chooses not to play the additional information or if the media disk placed in the I-DVD player is a conventional DVD disk, the navigator 14 conducts an ordinary DVD reproducing operation in response to a play-back request (S12).

If the disk is an I-DVD disk, the navigator 14 controls the file system 11 to load startup file (e.g., 'Index.html' and 'Index.syn') under the root directory of the I-DVD disk 10 into the storage unit 15 (S13). As stated earlier, storage unit 15 can be any type of data storage including a volatile memory buffer.

The navigator 14 interprets the startup file 'Index.html', for example, in the storage unit 15 with the assistance of the web browser 12, and sets up the system environment and parameters of the web browser 12 (S14). Web browser 12 has an Internet surfing function that specifies presentation form of A/V data, for example. Furthermore, user inputs may be received once system environment and parameters are setup.

The navigator 14 checks whether there is an Internet-connection request from a user (S15). If there is no request, a ROM-based A/V play-back of the A/V data stored on the storage unit 15 is conducted (S16). In a ROM-based reproduction, the contents included under, for example, the directory 'ENAV_TS' are synchronously presented with the A/V data read from the I-DVD disk 10 with reference to time information written in the sync file 'Index.syn', for example.

If a connection to the Internet is requested by a user (S15), to download contents with newer version than those on the T-DVD disk 10, then navigator 14, for example, reads a URL or other reference information included in the file 'EnDVD.Inf', for example, under the root directory to and control the web browser 12 and the interface 13 to make a connection to the content server addressed by the reference information.

If an Internet connection is made, the "version information" written in the file 'EnDVD.Inf', for example, is transmitted to the content server along with a download request for a setup and a sync file related with the latest contents compatible with the version information (S17). The content server searches a database, for example, for the files 'Index.html' and 'Index.syn' or their equivalents with the latest contents that are linked with the received version information. If found, the content server transmits the files to the I-DVD player. It should be noted that references made here in association with the Internet is to provide an exemplary description for the manner of operation of the system in accordance with one embodiment of the invention. Thus, the present system can operate in conjunction with any communication network. Further, references made to file formats or filenames are by way of example. Other file formats or alternative databases or data structures with equivalent functional use can be implemented or utilized, in other embodiments.

The navigator 14, in one embodiment, interprets the content of the 'Index.html' file, for example, for the latest version with help of the web browser 12 and resets the system environment for A/V data reproduction (S18). The received sync file 'Index.syn', for example, is stored in the storage unit 15 for future referral.

Referring to FIG. 5b, as discussed earlier, a user may decide to enable different interactive features of the system. For example, when a user selects the VTS mode (S20), the navigator 14 requests the content server 300 to supply additional content information (S21). The content server 300 collects the requests and transmits a data frame to the I-DVD player that requested the additional contents.

When an I-DVD player receives transmitted data frames from the content server 300, it searches A/V data recorded on the I-DVD disk for a location corresponding to the time stamp, for example, in a first data frame (S22). If the time stamp is equal to a first value (e.g., zero), then the I-DVD player sets its clock to the time stamp in the data frame and starts to reproduce A/V data from the referenced time. A value of zero, for example, may mean that the additional content is reproduced as soon as the A/V data play-back resumes. A higher value, for example, may instruct the I-DVD player to play-back the additional content after a certain time period has lapsed from the play start time.

If the first data frame includes additional A/V content, the I-DVD player presents it together with A/V data stored on the I-DVD disk. When another data frame is received (S23) the I-DVD player compares current playing time in its clock with a time stamp in the received data frame (S26) that is represented relative to the play start time.

If the time stamp is earlier than the current playing time (S27), the received data frame is discarded (S29) for the reasons discussed earlier. Otherwise, the additional A/V content in the received data frame is presented along with reproduced A/V data from the I-DVD disk, when the playing time of the I-DVD player's clock approximately matches the time stamp (S28).

In some embodiments, during play-back of A/V data, the I-DVD player may request the content server 300 to receive or deliver chatting data to other networked devices whenever the chatting data is provided by a user. When chatting data is provided, the content server 300 adds a time stamp relative to the play start time to the received chatting data to form a chatting data frame. The frame is then broadcasted to other networked devices, for example. The relative time can be added by the I-DVD player generating the chatting data instead of the content server 300, in some embodiments.

The broadcast chatting data frame is processed by the networked I-DVD players in a similar manner as an additional content frame. That is, if the relative time in a time stamp of a chatting data frame is earlier than current playing time, the chatting data frame is discarded. Otherwise, the chatting data is presented along with reproduced A/V data, according to the time stamp.

In one embodiment, if a user connects to the VTS network and plays an I-DVD disc, at a time after a first user has already started playing the I-DVD disk, the content server 300 remotely sets the I-DVD player to receive the earlier broadcasted data frames. When the late-connected I-DVD player receives a data frame broadcasted from the content server 300, for the first time after connection to the VTS network, it searches A/V data recorded on the I-DVD disk for a location corresponding to a time stamp, preferably imbedded in the first-received frame. If the target location is found, the I-DVD player sets its clock to the time stamp in the first data frame and starts to reproduce A/V data in accordance with the time stamp.

The above-explained interactive and enhanced navigation system and method enable a plurality of users, who view the same content played-back from an I-DVD disk, to view additional contents provided by other users at the point in time during the play-back when the content is provided by another user.

The preferred embodiments may be implemented as a method, apparatus or article of manufacture using standard programming and/or engineering techniques to produce software, firmware, hardware, or any combination thereof. Code or data stored in a computer readable medium is accessed and executed by a processor or a micro-controller. The code in which preferred embodiments are implemented may further be accessible through a transmission media or from a file server over a network. Of course, those skilled in the art will recognize that many modifications may be made to this configuration without departing from the scope of the present invention, and that the article of manufacture may comprise any information bearing medium known in the art.

The invention has been described, by way of example, as performing specific operations or steps that occur in a particular order. In alternative implementations, certain steps may be performed in a different order, or one or more steps may be added, modified or removed without moving away from the principals and the general concept of the invention. As provided, the various modes of operation and possible implementations of one or more embodiments of the invention may be achieved regardless of the specific order illustrated in the accompanying flow diagrams.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of reproducing information stored on a data recording medium using a playing device connected to a communication network, the method comprising:
    loading a start-up file into a memory, the start-up file including information associated with a system environment;
    setting the system environment according to the start-up file;
    sending version information and a download request to a server via the communication network, wherein the version information includes at least one of disk version information and content version information;
    re-setting the system environment based on a file received from the server in response to the version information, the file including a sync file for the version information;
    determining if second information associated with first information is available through the communication network in response to the download request, when a specific service mode is selected by a user, the first information having audiovisual data recorded on the data recording medium and a play start time ST, and the second information having auxiliary information associated with the audiovisual data;
    receiving the second information from the communication network as a result of the determining step, the second information including a time stamp relative to another play start time of another playing device which is playing the same data recording medium and has provided the second information and being linked with the version information;
    comparing the time stamp of the second information to a current play time relative to the play start time ST; and
    when the time stamp of the second information precedes the current play time, searching a play time of the playing device to the time stamp of the second information, and reproducing the audiovisual data from the searched location along with the second information with respect to the set play time.

2. The method of claim 1, wherein the second information is provided by the server connected to the communication network or by said another playing device connected to the communication network.

3. The method of claim 1, wherein the start-up file includes a reference to at least a location on the communication network where the second information is stored.

4. The method of claim 1, wherein the second information is provided by a user that reproduced the same data recording medium using said another playing device connected to the communication network at the time stamp relative to said another play start time.

5. The method of claim 1, wherein the second information is not reproduced in response to a user request.

6. The method of claim 1, further comprising:
    uploading third information associated with the first information to the communication network along with third information timing information.

7. A data reproduction system connected to a communication network for reproducing data recorded on a data recording medium, the system comprising:
    a loading device configured to read a start-up file and first information from the data recording medium and load the read start-up file and the first information, the start-up file including information associated with a system environment, the first information comprising audiovisual data hand having a play start time ST;
    an interface device configured to send or receive data to or from a server via the connected communication network;
    a controller configured to set the system environment according to the start-up file, control the interface device to send version information including at least one of disk version information and content version information and a download request to the server, re-set the system environment based on a file received from the server in response to the version information, the file including a sync file for the version information, determine if second information associated with the first information is available through the communication network in response to the download request, when a specific service mode is selected by a user, control the interface device to receive the second information from the communication network as a result of the determination, the second information comprising auxiliary information associated with the audiovisual data, being linked with version information, and including a time stamp relative to another play start time of other data reproduction system which is playing the same data recording medium and has provided the second information, compare the time stamp of the second information to the current play time relative to the play start time ST, and when the time stamp of the second information precedes the current play time, search for a location of audiovisual data corresponding to the time stamp of the second information, and set a play time of the data reproduction system to the time stamp of the second information; and
    a reproducing device configured to reproduce the audiovisual data for the searched location along with the second information with respect to the set play time.

8. The system of claim 7, wherein the start-up file includes a reference to at least a location on the communication network where the second information is stored.

9. The system of claim 7, wherein the second information is provided by a user that reproduced the first information using said other data reproduction system connected to the communication network at a play time PT.

10. The system of claim 7, wherein the controller is configured to control the reproducing device so as not to reproduce the second information in response to a user request.

11. The system of claim 7, wherein the controller is configured to control the interface device to upload third information associated with the first information to the communication network along with third information timing information.

* * * * *